Uardstates Patent [19]

Günther et al.

[11] Patent Number: 4,983,327
[45] Date of Patent: * Jan. 8, 1991

[54] PROCESS FOR ISOLATING A PHOSPHATIDYLCHOLINE FREE OF OTHER PHOSPHOLIPIDS IN THE STARTING MATERIAL

[75] Inventors: Bernd-Rainer Günther, Bergheim; Rainer Losch, Bonn, both of Fed. Rep. of Germany

[73] Assignee: A. Nattermann & CIE GmbH, Cologne, Fed. Rep. of Germany

[*] Notice: The portion of the term of this patent subsequent to Aug. 15, 2006 has been disclaimed.

[21] Appl. No.: 214,844

[22] Filed: Jun. 30, 1988

Related U.S. Application Data

[63] Continuation of Ser. No. 57,699, May 26, 1987, abandoned, which is a continuation of Ser. No. 806,768, Dec. 9, 1985, abandoned.

[30] Foreign Application Priority Data

Dec. 17, 1984 [DE] Fed. Rep. of Germany ....... 3445949

[51] Int. Cl.$^5$ .......................... C11C 1/02; C11B 7/00; C11B 1/10
[52] U.S. Cl. ..................................... 260/403; 558/146
[58] Field of Search .......................... 260/403; 558/146

[56] References Cited

U.S. PATENT DOCUMENTS

| 4,425,276 | 1/1984 | Günther | 260/403 |
| 4,443,378 | 4/1984 | Gunther | 260/403 |
| 4,452,743 | 6/1984 | Günther | 260/403 |
| 4,857,236 | 8/1989 | Gunther et al. | 260/403 |

FOREIGN PATENT DOCUMENTS 2915614 10/1980 Fed. Rep. of Germany ...... 260/403

OTHER PUBLICATIONS

*The Merck Index*, Tenth Edition, (1983), pp. 779–780, (#5271).

Primary Examiner—Carolyn S. Elmore
Attorney, Agent, or Firm—Pearne, Gordon, McCoy & Granger

[57] ABSTRACT

A process for isolating a phosphatidylcholine from vegetable lipid mixtures wherein the lipid mixture is dissolved in a solvent mixture of a low boiling petroleum ether fraction (40°–80° C.), a lower $C_1$–$C_4$-alkanol and water, the solution is introduced into a column filled with silica gel at a temperature in the range of 20° to 50° C., the elution is carried out at that temperature with the same solvent mixture and the main run is collected and a pure phosphatidylcholine free of other phospholipids present in the starting vegetable lipid mixture is isolated therefrom in a usual manner.

5 Claims, No Drawings

PROCESS FOR ISOLATING A PHOSPHATIDYLCHOLINE FREE OF OTHER PHOSPHOLIPIDS IN THE STARTING MATERIAL

This is a continuation of application Ser. No. 057,699, filed on May 26, 1987, abandoned which in turn is a continuation of application Ser. No. 806,768, filed on Dec. 9, 1985, now abandoned.

SPECIFICATION

The invention relates to a new process for isolating a pure 1,2-diacyl-glycero-3-phosphocholine (phosphatidylcholine) which is free of incidental phospholipids by chromatography of a lipid solution on silica gel.

In pharmacy, vegetable phosphatidylcholine is used as active agent and as excipient.

For the use as active agent, phospholipids having a high content of phosphatidylcholine (oral) or highly pure phosphatidylcholine almost free of lysophosphatidylcholine (intravenous) are necessary.

For the use as excipient, f.e. as emulsifying agent for the preparation of fat emulsions to be administered parenterally or for the use for forming liposomes and mixed micelles, respectively, the phosphatidylcholine has to be free of haemolytically acting lysophosphatidylcholine.

As starting material for recovering the vegetable phosphatidylcholine, a raw phosphatide occuring in the preparation of soya oil and edible oil (salad-oil) respectively, also called raw lecithin and raw phosphatide, respectively or commercial lecithin, is used. (Kirk-Othmer, Encycl. Chem. Technol. Vol. 14, pages 250–269/P.H. List, Pharm. Verfahrenstechn. heute 1 (7) 1–8 (1980))

The soya lecithin (soy raw-phosphatide) contains:
60–70% polar lipids (phospholipids/glycolipids)
27–37% soya oil
1.5–2% water
0.5–2% various incidental substances.

The polar lipids, also called pure lecithin, obtained by deoiling the raw lecithin and soya lecithin, respectively, have the following composition (approximate values):
30% phosphatidylcholine (PC)
2% lysophosphatidylcholine (LPC)
22% phosphatidylethanolamine (PE)
2% lysophosphatidylethanolamine (LPE)
3% phosphatidylserine (PS)
15% phosphatidylinositol (PI)
1% lysophosphatidylinositol (LPI)
13% phytoglycolipids (PGL)
8% phosphatidic acid (PA)
4% incidental lipids A soya lecithin (soya raw phosphatide) of minor quality can contain up to 5lysophosphatidylcholine.

Several processes for the preparation of enriched phosphatidylcholine fractions are known. By acetonic deoiling of the soya raw phosphatide (U.S. Pat. No. 3,268,335), a mixture of polar lipids (pure lecithin) is obtained.

By the alcoholic extraction of soya raw phosphatide (German patent No. 1,492,952), an oil containing mixture of polar lipids enriched in phosphatidylcholine is obtained.

Recently, new technologies for recovering polar lipids are described, f.e. in DE-OS No. 3,011,185, wherein soya raw phosphatide is deoiled by the extraction by means of overcritical $CO_2$ or wherein as in the European patent application No. 0049914 by means of ultrafiltration from solutions of the phospholipids in hexane/propanol-2 (75/25) fractions enriched in phosphatidylcholine are obtained. In case that oil containing phospholipid mixtures like soya raw phosphatide, are used in this process, either an acetonic deoiling or the use of a solvent gradient is necessary.

The recovery of a phosphatidylcholine free of incidental phospholipid is the result of a chromatographic separation of the phospholipids. The combination of the adsorbents with the eluent and the elution temperature in this case have a decisive importance.

Starting from soya raw phosphatide, in a multistep process a pure phosphatidylcholine containing 3–4% lysophosphatidylcholine is obtained by chromatography on alumina with ethanol as eluent (U.S. Pat. No. 3,031,478). The alumina is loaded with phospholipids like phosphatidylethanolamine, phosphatidylinositol, phosphatidic acid and glycolipids; since it is not regenerable, it must be discarded.

Frequently, silica gel is used as adsorbent for the separation of phospholipids. In DE-OS No. 2,915,614, there is described a process for separating oil and stearins from soya raw phosphatides in order to recover pure lecithin by means of chromatography of a petroleum ether solution on silica gel. The oil and the stearins remain on the silica gel, they have to be eluted with polar solvents in a second cut.

Phospholipids are retained from alcoholic solutions by silica gel at room temperature (H. Richter et al., Pharamazie 1977, 32, 164). The separation or selective desorption of the phosphatides is carried out either with alcohol/ammonia (Japan Kokai No. 4909 3400) or with mixtures of chloroform/methanol and chloroform/methanol/water, respectively (DDR patent No. 79,916). Principally, the recovery of a phosphatidylcholine free of lysophosphatidylcholine by chromatography on silica gel by using an eluent gradient of chloroform/methanol and chloroform/methanol/water, respectively, is possible. The recovery and the removal of such solvent mixtures from the final product is very complicated especially then, when a gradient elution is carried out (partly azeotropic mixtures).

The process described in DE-OS No. 3,047,048 for isolating phosphatidylcholine from alcoholic phospholipid solutions by means of silica gel column chromatography at elevated temperatures consists of two steps:
1. Extraction from soya raw phosphatide Yield of phoshatidylcholine: about 60%
2. Purification by column chromatography Yield of phosphatidylcholine: about 73%

The total yield of phosphatidylcholine over both steps is about 44% of the theory, based on soya raw phosphatide.

This efficiency is not satisfactory. The phosphatidylcholine in addition contains traces of phosphatidylethanolamine and lysophosphatidylcholine. Since the lysophosphatidylcholine cannot be separated by the processes of the prior art, only a soya a raw phosphatide of the highest quality which already has a content of lysophosphatidylcholine of $\leq 0.5\%$ can be used when it is desirable to produce phosphatidylcholine products having a low content of lysophosphatidylcholine.

All already described processes for isolating phosphatidylcholine free of incidental phosphatide from soya raw phosphatide have one or more of the following disadvantages:
multistep procedure low yield of phosphatidylcholine use of solvent mixtures which are hardly regenerable for the separation by column chromatography, partly by using eluent gradients, use of toxic solvents selection of the starting materials in accordance with the lysophosphatidylcholine non-regenerable adsorbents presence of incidental phospholipids like phosphatidylethanolamine and lysophosphatidylcholine in the final product low content of phosphatidylcholine.

These disadvantages inevitably lead to high preparation costs and do not provide the desired phosphatidylcholine free of incidental phospholipid, respectively.

The object of the present invention is to provide a simple process for isolating a phosphatidylcholine free of incidental phospholipids, particularly free of lysophosphatidylcholine from raw phosphatides (soya, rape, sunflowers).

Surprisingly, it has been found that in a onestep process, a phosphatidylcholine free of incidental phospholipid can be obtained from a raw phosphatide solution by means of silicia gel column chromatography, using a particular solvent, particular conditions and collecting a particular praction in the elution.

The process of the invention is characterized in that the raw phosphatide is dissolved in a solvent mixture of a low boiling petroleum ether fraction (40°–80° C.), a lower $C_1$–$C_4$-alkanol and water, that the solution is introduced into a column filled with silica gel, that the elution is carried out at this temperature using the same solvent mixture and in the elution the main run is collected and the eluted material is isolated as usual, thus obtaining a phosphatidylcholine free of incidental phosphatide, i.e. other phosphatides present in the starting phosphatide mixture. Preferably, a solvent mixture of 1 part by volume of light petrol (65°–73° C.), 1 part by volume of propanol-2 and 0.175 part by volume of water is used.

The other lipids contained in the starting raw phosphatide are separated in a pre-run and in a post-run. It is surprising that it is possible to isolate in the main run from such a multisubstance mixture in a onestep process a pure phosphatidylcholine only contaminated by traces of glycolipids.

The glycolipids can be removed in a manner-known per se, f.e. by dissolving phosphatidylcholine with ethanol (glycolipids are insoluble in ethanol). In such way, a phosphatidylcholine of high purity is obtained which is free of incidental substance, particularly free of lysophosphatidylcholine.

For Example, these are obtained phosphatidylcholine of pure standard and, respectively, phosphatidylcholine of high purity standard from soya raw phosphatide with the yield of 88% of the theoretical and 86% of the theoretical, respectively, each based on the used soya raw phosphatide, which is a yield not reached until now.

In addition to the simple procedure, the novel process has the advantage that also inferior raw phosphatides can be used. This also applies for phosphatidylcholines prepared from inferior raw phosphatides according to known processes which are contaminated by lysophosphatidylcholine.

As silica gel, common products for the chromatography of various grain size or compressed silica gel which can be activated or deactivated, can be used. Preferably, neutral silica gel is used.

The process of the invention can be carried out at normal pressure or at superatmospheric pressure and at temperatures as allowable for the pressures, preferably at 20°–50° C.

A specific advantage of the process of the invention is that the silica gel after the chromatography can always be re-used. All contaminants are contained in the pre-run and the post-run, respectively. The post-run can be omitted, since if the column is refilled, the contaminants contained therein are eluted with the next-following pre-run.

An additional advantage is that an easily redistillable solvent mixture can be used.

A comparison with known processes shows the economic advantages of the novel onestep process procedure. For example, the soya phosphatidylcholine is recovered from soya raw phosphatide with a yield of 88%. In a column chromatographic separation, 110 g of soya raw phosphatide are separated on 200 g of silica gel, only 4.4 l of total eluate being necessary. The process has the character of a filtration rather than that of a purification by column chromatography in the common sense.

The invention is illustrated by the following examples without being limited thereto.

EXAMPLES

Analysis

The phospholipids are analyzed by means of thin layer chromatography. The oil content was considered equal to the dialysable material. The water content was determined according to Karl Fischer and the content of the residual solvent was determined by gas chromatography.

Solvent and eluent mixture

A mixture of 1 part by volume of light petrol (65°–73° C.), 1 part by volume of propanol-2 and 0.175 part by volume of water was used.

Column chromatography

A double jacket chromatography column (inner diameter 4.5 cm; height 37 cm) was used. A heat exchanger was provided before the column. The column was filled with a slurry of 200 g of silica gel (Woelm) in the stated solvent mixture. After the completed chromatography, the silica gel can be re-used.

Starting material

Raw phosphatides having the following composition were used:

|  |  | soya | rape | sunflower |
|---|---|---|---|---|
| phosphatidylcholine | (PC) | 16% | 18% | 22% |
| phosphatidylethanolamine | (PE) | 17% | 13% | 13% |
| lysophosphatidylcholine | (LPC) | 2.5% | 2.6% | 1.0% |
| phosphatidylinositol | (PI) | 9% | 12% | 13% |
| N-acyl-phosphatidylethanolamine | (N-Acyl-PE) | 2% | 1% | 1% |
| phosphatidic acid | (PA) | 8% | 7% | 5% |
| oil |  | 35% | 36% | 30% | rest: other lipids

EXAMPLE 1

450 ml of a solution of 110 g of soya raw phosphatide (having 16% PC and 2.5% LPC) in the stated solvent mixture are introduced into the chromatographic column filled with a silica gel (200 g) and eluted with the same solvent mixture at room temperature. The total eluate is divided into three fractions: the fractions are evaporated and the residues are analyzed.
1. Fraction 0–1.6 l residue: 89, 5 g containing neutral lipids, glycolipids and phospholipids like PE, N-Acyl-PE, PA, PI and traces of PC
2. Fraction 1.8–4.4 l residue: 18 g (pure phosphatidylcholine) PC content: 86% oil content: 0.5%

The thin layer chromatographic examination shows only glycolipids as contaminant besides PC. PC efficiency: 88% of the theory, based on soya raw phosphatide.
3. Fraction 4.4 1–5.0 l residue: 2 g containing PC, LPC and traces of glycolipids.

There remains a minor PC rest load on the silica gel.

18 of the fraction 2 containing 86% phosphatidylcholine are stirred for 1 hour at room temperature with 200 ml of 95% ethanol. The insoluble glycolipids are filtrated over 1 g of alumina as filter aid. The filtrate is evaporated and the residue is analyzed.

| Residue: | 15.8 g (phosphatidylcholine of high purity) |
|---|---|
| PC content: | 96% |
| Water: | 1.6% |
| Oil: | 0.5% |
| Ethanol: | 0.8% |
| PC efficiency: | 86% of the theory, based on soya raw phosphatide |
| Purity (DC): | No further contaminants were determined. |

EXAMPLE 2

According to example 1, a test was carried out at a column temperature of 50° C. The same fraction cuts were made with an unchanged total eluate volume. The second fraction contained 16.5 g of a solid containing 87% PC (pure phosphatidylcholine). The thin layer chromatographic purity corresponded to that of the product of example 1.

EXAMPLE 3 (comparative example, process according to DE-OS No. 3,047,048)

344 g of soya raw phosphatide (containing 16.5% PC and 2.5% LPC) are stirred with 1032 ml of 96% ethanol for 5 minutes at 75° C. The sediment is separated at room temperature and the upper ethanol phase is evaporated.

| Residue: | 110 g |
|---|---|
| PC content: | 30% |
| PC efficiency: | 60% of the theory, based on soya raw phosphatide |

110 g of the residue are dissolved in 350 ml of 96% ethanol and separated according to DE-OS No. 3,047,048 (example 1) by means of column chromatography on silica gel at 70° C. using 96% ethanol as eluent. The main run was evaporated and the residue was analyzed.

| Residue: | 27.7 g |
|---|---|
| PC content: | 87% |
| LPC content: | 5% |
| PC efficiency: | 73% |

30 g of the residue from the main run containing the phosphatidylcholine with 87% PC and 5% LPC are dissolved in 150 ml of a mixture of 1 part by volume of light petrol (65°–73° C.), 1 part by volume of propanol-2 and 0.175 part by volume of water, introduced into a chromatographic column filled with silica gel (200 g) and eluted with the same solvent mixture at room temperature. After 400 ml of pre-run, 3.5 l of main run are collected.

The main run is evaporated and the residue is analyzed.

| Residue: | 22 g | |
|---|---|---|
| PC content: | 95% | |
| Oil content: | ≦0.5% | |
| LPC content: | ≦0.2% | (measuring limit) |
| PC efficiency: | 80% | of the theory, based on the starting material |
| Water: | 1.5% | |

EXAMPLE 4

500 ml of a solution of 125 g of sunflower raw phosphatide with 22% PC and 1.0% LPC in the stated solvent mixture are introduced into a chromatographic column filled with silica gel (200 g) and eluted with the same solvent mixture at room temperature. The total eluate is divided into two fractions. The fractions are evaporated and the residues are analyzed.
1. Fraction 0–1.0 l residue: 97 g Containing neutral lipids, glycolipids and phospholipids like PE, N-Acyl-PE, PA, PI and traces of PC.
2. Fraction 1.0–4.0 l residue: 26 g; PC content: 87%; Oil content: 0.7%

The thin layer chromatographic examination shows only glycolipids as contaminant besides PC. PC efficiency: 83% of the theory, based on the sunflower raw phosphatide.

There remains a minor PC rest load on the silica gel.

26 g of the second fraction containing 87% phosphatidylcholine are stirred for one hour with 200 ml of 95% ethanol at room temperature. The insoluble glycolipids are filtrated over 1 g alumina as filter aid. The filtrate is evaporated and the residue is analyzed.

| Residue: | 23.2 g (phosphatidylcholine of high purity) |
|---|---|
| PC content: | 97% |
| Oil content: | 0.7% |
| Dry loss: | 1.5% |
| PC efficiency: | 82% of the theory, based on the sunflower raw phosphatide |
| Purity (DC): | No further contaminants were determined. |

EXAMPLE 5

500 ml of a solution of 160 g of rape raw phosphatide (18% PC, 2.6% LPC) in the stated solvent mixture are treated according to example 4.

| | |
|---|---|
| Residue: | 20.7 g (phosphatidylcholine of high purity) |
| PC content: | 96% |
| Oil content: | 1.3% |
| Dry loss: | 2.0% |
| PC efficiency: | 69% of the theory, based on the rape raw phosphatide |
| Purity (DC): | No further contaminants were determined. |

We claim:

1. A process for isolating phosphatidylcholine from vegetable lipid mixtures wherein the lipid mixture is dissolved in a solvent mixture of 1 part by volume of a petroleum ether fraction (65°–73° C.), 1 part by volume of propanol-2 and 0.175 part by volume of water is used, the solution is introduced into a column filled with silica gel at a temperature in the range from 20° to 50° C., the elution is carried out at this temperature with the same solvent mixture and the main run is collected and a pure phosphatidylcholine free of other phospholipids present in the starting vegetable lipid mixture is isolated therefrom.

2. The process according to claim 1 wherein the lipid mixture is composed of polar and unpolar vegetable lipids occurring in raw phosphatides (raw lecithins).

3. The process according to claim 2 wherein the lipid mixture consists of phospholipids containing phosphatidylcholine.

4. The process according to claim 1 wherein the lipid mixture is composed of polar and unpolar vegetable lipids occuring in raw phosphatides (raw lecithins).

5. The process according to claim 4 wherein the lipid mixture consists of phospholipids containing phosphatidylcholine.

* * * * *